United States Patent
Iwamoto et al.

(10) Patent No.: US 7,898,590 B2
(45) Date of Patent: Mar. 1, 2011

(54) DEVICE HAVING IMAGING FUNCTION

(75) Inventors: Atsushi Iwamoto, Osaka (JP); Tetsuya Shihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 566 days.

(21) Appl. No.: 11/907,629

(22) Filed: Oct. 15, 2007

(65) Prior Publication Data
US 2008/0088714 A1    Apr. 17, 2008

(30) Foreign Application Priority Data
Oct. 16, 2006    (JP) .............................. 2006-280981

(51) Int. Cl.
*H04N 5/222*    (2006.01)
(52) U.S. Cl. ................................. 348/333.01
(58) Field of Classification Search ............. 348/333.01
See application file for complete search history.

(56) References Cited

U.S. PATENT DOCUMENTS

| | | | |
|---|---|---|---|
| 6,765,608 B1 | 7/2004 | Himeda et al. ............ 348/211.5 |
| 7,218,342 B2 * | 5/2007 | Kobayashi et al. ........ 348/211.8 |
| 2003/0103139 A1 * | 6/2003 | Pretzer et al. ................ 348/143 |
| 2003/0231787 A1 | 12/2003 | Sumi ........................... 382/103 |
| 2004/0001220 A1 | 1/2004 | Gorday et al. .............. 358/1.15 |
| 2005/0226464 A1 * | 10/2005 | Sun et al. ..................... 382/103 |
| 2005/0270372 A1 * | 12/2005 | Henninger, III ............. 348/143 |
| 2007/0116328 A1 * | 5/2007 | Sablak et al. ................ 382/103 |

FOREIGN PATENT DOCUMENTS

| | | |
|---|---|---|
| EP | 0 999 518 A1 | 5/2000 |
| JP | 63-142986 | 6/1988 |
| JP | 08-032945 | 2/1996 |
| WO | WO 02/085018 A1 | 10/2002 |

* cited by examiner

*Primary Examiner*—James M Hannett
(74) *Attorney, Agent, or Firm*—Morgan, Lewis & Bockius LLP

(57) ABSTRACT

A device having an imaging function includes: a camera portion to capture optically an image of an object and to output the image as an image data; a display portion to perform an image displaying using the image data from the camera portion; and a control portion to decide a representative figure by extracting features of the image from the image data of a whole photographed screen and to control the display portion so that if a position of the representative figure is changed, the display portion performs an image displaying to which a process corresponding to the change is applied.

4 Claims, 9 Drawing Sheets

FIG.7A
FIG.7D
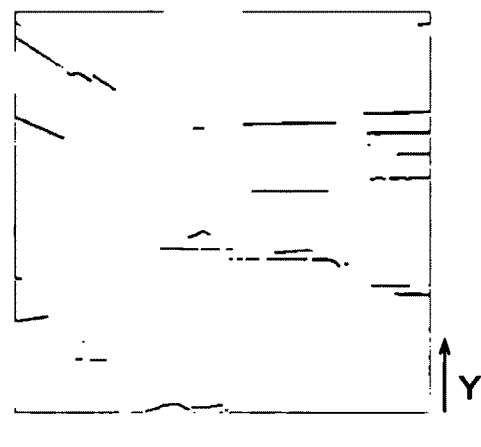
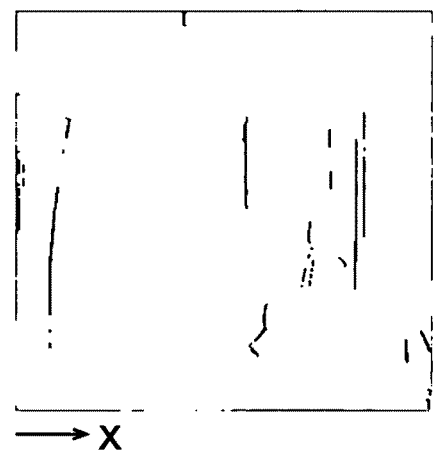
FIG.7B
FIG.7E
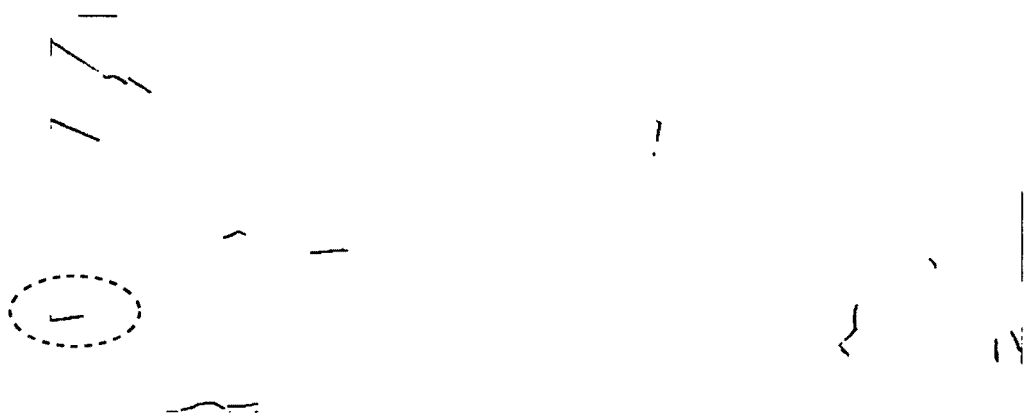
FIG.7C
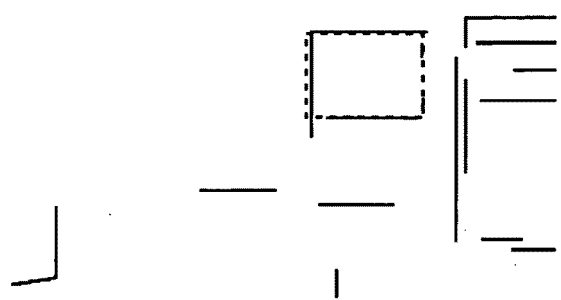

DEVICE HAVING IMAGING FUNCTION

This application is based on Japanese Patent Application No. 2006-280981 filed on Oct. 16, 2006, the contents of which are hereby incorporated by reference.

BACKGROUND OF THE INVENTION

1. Field of the Invention

The present invention relates to a device having an imaging function, and in particular, the present invention relates to a digital device having an image capturing function to capture an image of an object utilizing an imaging element such as a television telephone, a surveillance camera, a drive recorder, and the like, for example.

2. Description of Related Art

In a device having an imaging function such as a television telephone, it is required to restrict displaying of a specific photographed image in order to protect security or privacy. To fulfill this requirement, a television telephone which employs a structure that closes a camera cover to prevent input of an image when a prescribed condition is not fulfilled, has been proposed in JP-A-H08-032945. However by this structure the television telephone can not deal with a case where there is a part not to display in one part of a photographed screen. For example, it cannot perform a display of photographed image with covering only clothes of a speaker or only background of the speaker.

The above described problem can be solved by employing a structure which converts an area other than a part of a face of the speaker to a prescribed covering information to display such as a television telephone that has been proposed in JP-A-S63-142986. In the television telephone disclosed in JP-A-S63-142986, a structure is employed in which the part not to display is covered by focusing on that a variation of mouth movement is larger than a variation of eye movement, designating coordinates of a predetermined above and below and right and left area of coordinates of a mouth position as a reference point and inputting an image signal of bright neutral color to coordinates other than the area. Further in JP-A-S63-142986, a structure is also disclosed in which a speaker designates an area to be covered by manual operation while the speaker sees the picture screen.

However, in the television telephone disclosed in JP-A-S63-142986, because it is necessary to detect the mouth position, there is a possibility that the part not to display in the photographed screen is displayed, when the speaker changes direction of his/her face or the speaker leaves from the television telephone. These problems can be solved in a certain extent by that the speaker designates the part to be covered with a manual control. However, it cannot deal with a case where the television telephone is abruptly moved. That is to say, if a position of the photographed screen is shifted by change of position of the television telephone, the part not to display comes off from the covered area and it is displayed. At any rate, by the television telephone disclosed in JP-A-S63-142986, change of relative position of the object with respect to the photographed screen cannot be detected, as a result, there is always a possibility that the part not to display in the photographed screen is displayed.

SUMMARY OF THE INVENTION

The present invention is made in view of the above described situation and it is an object of the present invention to provide a device having an imaging function which can deal with change of a device position.

To attain the above described object a device having an imaging function in accordance with one aspect of the present invention includes: a camera portion to capture optically an image of an object and to output the image as an image data; a display portion to perform an image displaying using the image data from the camera portion; and a control portion to decide a representative figure by extracting features of the image from the image data of a whole photographed screen and to control the display portion so that if a position of the representative figure is changed, the display portion performs an image displaying to which a process corresponding to the change is applied.

BRIEF DESCRIPTION OF THE DRAWINGS

FIGS. 1A to 1D are explanatory diagrams to show examples of control operations of a device having an imaging function by photographed screens and the like.

FIGS. 6A to 6E are explanatory diagrams to show how to obtain a representative figure (part 1) by photographed screens and the like.

FIGS. 7A to 7E are explanatory diagrams to show how to obtain a representative figure (part 2) by photographed screens and the like.

DETAILED DESCRIPTION OF THE PREFERRED EMBODIMENTS

Hereinafter a device having an imaging function in accordance with the present invention will be described with reference to attached diagrams. One embodiment of the device having the imaging function will be explained using a television telephone, a surveillance camera, and a drive recorder as examples in this description, but the devices according to the present invention should not limit to these examples. For example, the present invention can be applicable to a digital device having an image input function such as a mobile phone having camera, an intercom having camera and the like; a camera such as a digital camera, a video camera and the like. Further, the present invention can also be applicable to a device which is composed by adding an imaging function to a personal computer, a mobile computer, a handheld information terminal, a peripheral equipment of these devices such as a mouse, a scanner, a printer and the like, and other devices.

When the device having the imaging function moves, generally a positional displacement is generated in its photographed screen. If the device, for example a television telephone, has a function to cover a part not to display in the photographed screen, there is a possibility that the part not to display comes off the covered area by the positional displacement of the photographed screen as described above. However, the generation of the positional displacement of the photographed screen also means that change of the device position can be detected from the photographed screen. If the change of device position can be detected from the photographed screen, it is possible to correct the covered area such that the part not to display does not come off the covered area, and it is also possible to report the change of the device position as occurrence of abnormal circumstances. The embodiment which will be described below is focused on this point, and the device in the embodiment is configured to deal with the change of the device position by detecting the change.

Figure 1A:
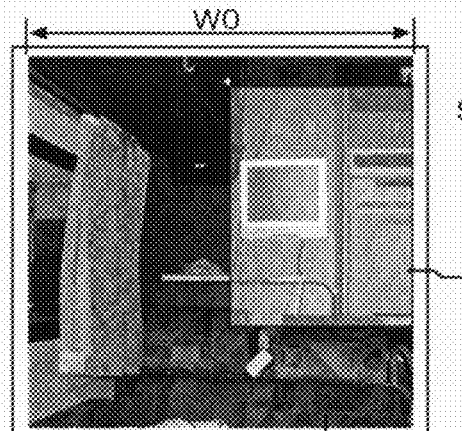
Figure 1D:
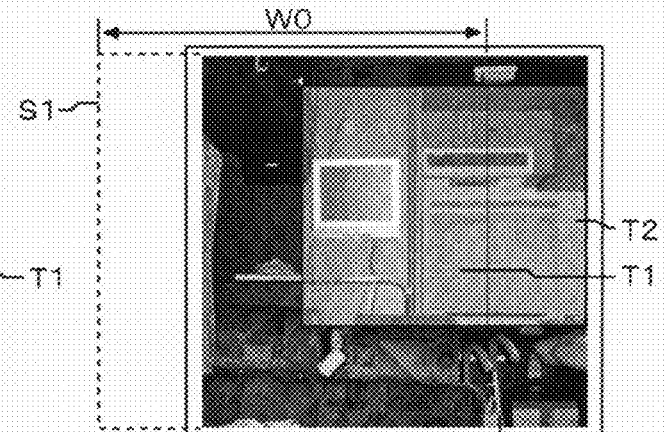
Figure 1B:
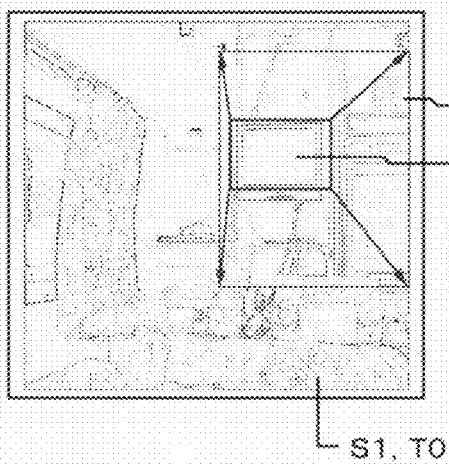
Figure 1C:
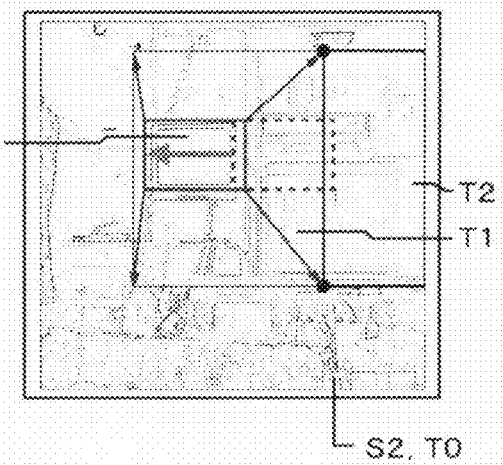
Figure 2:
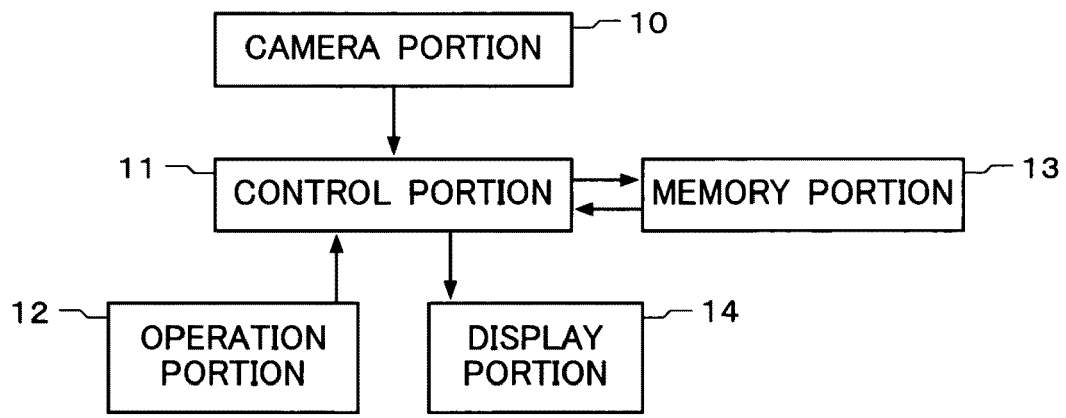
FIG. 2 is a block diagram to show one example of a schematic structure of an embodiment of a television telephone.
Figure 3:
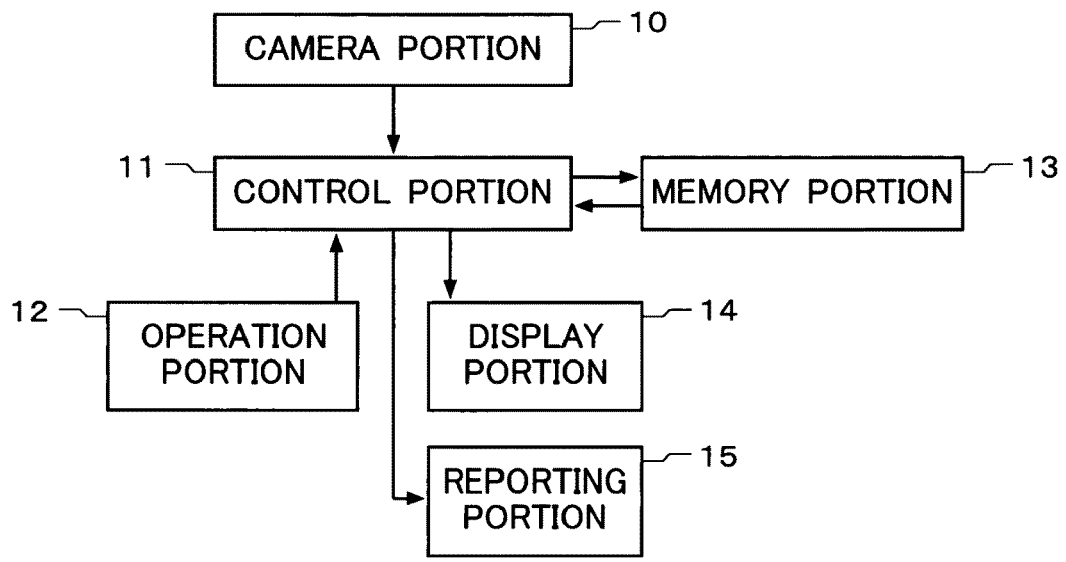
FIG. 3 is a block diagram to show one example of a schematic structure of an embodiment of a surveillance camera or a drive recorder.

In FIGS. 1A to 1D, examples of a control operation of a device having the imaging function are shown by photographed screens and the like. One example of a schematic structure of an embodiment is shown in FIG. 2 as a block diagram in a case if the device is a television telephone. Another example of a schematic structure of an embodiment is shown in FIG. 3 as a block diagram in a case if the device is a surveillance camera or a drive recorder. In the embodiment of the television telephone the device includes a camera portion 10, a control portion 11, an operation portion 12, a memory portion 13, and a display portion 14 as shown in FIG. 2. In the embodiment of the surveillance camera or the drive recorder the device includes a camera portion 10, a control portion 11, an operation portion 12, a memory portion 13, a display portion 14, and a reporting portion 15 as shown in FIG. 3.

The camera portion 10 captures optically an image of an object and outputs it as an image data, and the display portion 14 performs an image displaying using the image data from the camera portion 10. The operation portion 12 is configured to designate an area of a prescribed part as a covered area T1 (FIGS. 1A to 1D) in order to cover the part within the photographed screen T0 (FIGS. 1A to 1D). As for examples of the operation portion 12 to be more concrete, a mouse, a keyboard, or the like can be given. It is no problem that the operation portion 12 and the display portion 14 are composed by a touch panel type monitor. The memory portion 13 is configured to memorize at least one of the covered area T1 and a representative figure U1, and as for examples to be more concrete, a flash memory, a hard disk or the like can be given. The reporting portion 15 is configured to perform a reporting to outside of the device and, for example, it is a unit to transmit information (voice information, character information and the like) to a user's receiver unit such as a mobile phone, a personal computer, or the like.

The control portion 11 is configured to control respective portions of the device. For example, the control portion 11 controls the display portion 14 not to perform the image displaying using the image data at the covered area T1 which is designated by the operation portion 12. Further, the control portion 11 decides the representative figure U1 (FIG. 1B) by extracting futures of the image from the image data of the whole photographed screen T0. When a position of the representative figure U1 is changed, the control portion 11 controls the display portion 14 such that the image displaying is performed on which a process corresponding to the change is applied. In the embodiment of the surveillance camera or the drive recorder, the control portion 11 controls the reporting portion 15 such that the change of device position is reported when the position of the representative figure U1 is changed over a prescribed value.

Hereinafter, an example of the control operation will be explained in a case where the device having the imaging function is the television telephone. When a system of the television telephone is activated, a photographed screen T0 shown in FIG. 1A is displayed on the display portion 14 (FIG. 2). An image which is displayed in this photographed screen T0 is an original image S1. A speaker is usually displayed in center of the photographed screen T0, however in this example, an image of the speaker is omitted and only background is displayed. From a view point to protect privacy or the like, if there is a part not to display in the photographed screen T0, a user designates an area of the part as the covered area T1 utilizing the operation portion 12. Then the control portion 11 begins a control operation of "registration of the covered area" which is shown in a flowchart of FIG. 4.

Figure 4:
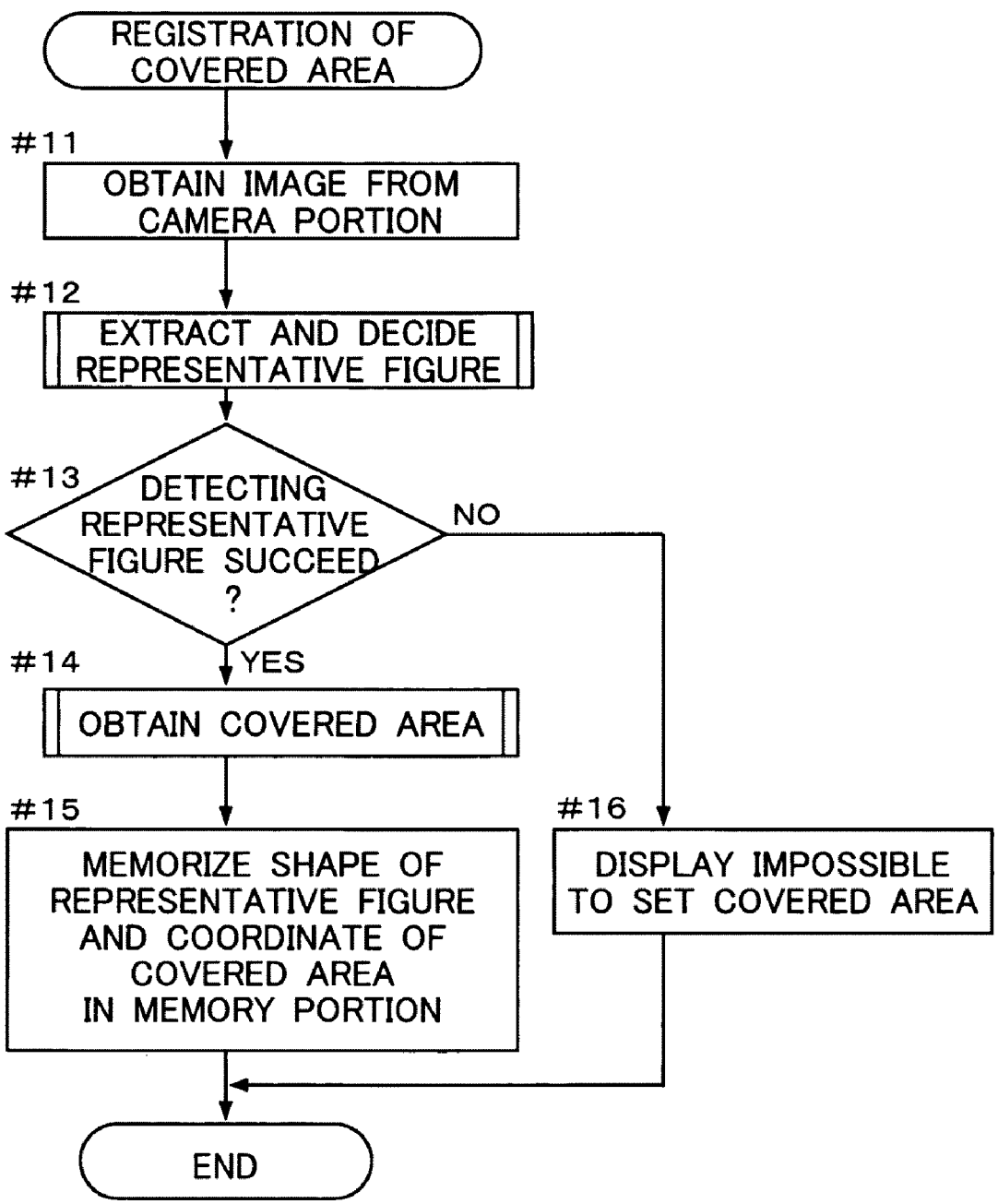
FIG. 4 is a flow chart to show a control operation of registration of a covered area in the embodiment of the television telephone.

When the system goes in the flow shown in FIG. 4, first the image data is obtained from the camera portion 10 (#11). Then the representative figure U1 (FIG. 1B) is decided by extracting features of the image from the image data of the whole photographed screen T0 (#12). The representative figure U1 is configured to represent the position of the original image S1. As a result, which area of the original image S1 is designated as the covered area T1 can be known from a relative position of the covered area T1 with respect to the representative figure U1.

In a step of extracting and deciding the representative figure U1 (#12), the representative figure U1 is decided by applying a digital image process to the original image S1 and selecting a figure which fulfills a prescribed condition. A figure which has many straight lines is suitable for the representative figure U1 because in many cases the figure is artificial one and a shape of it is hard to be deformed. However, a figure which is easy to be deformed in its shape by wind or the like such as a curtain is not suitable for the representative figure U1. From this view point, a figure which has many straight lines is selected and decided as the representative figure U1 from the image data of the whole photographed screen T0. For example, when the original image (colored image) S1 shown in FIG. 1A is converted into a gray scale image, and then a digital filter is applied to it, high frequency components of the image are removed and an image in which parts that have strong edges are remained is obtained as shown in FIG. 1B. In the photographed screen T0 shown in FIG. 1A, a television screen is judged as a figure which has many straight lines and extracted as the representative figure U1.

Figure 6A:
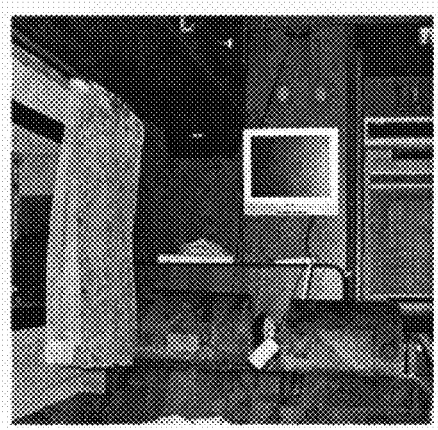
Figure 6B:
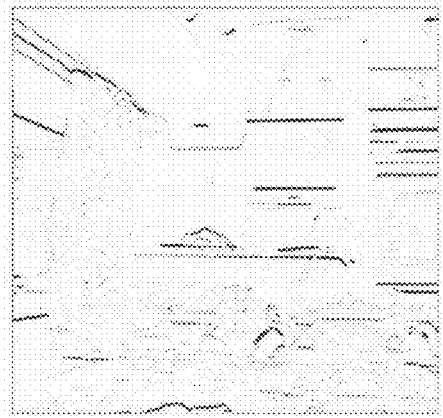

How to obtain the representative figure U1 will be described further in more detail. A figure which is converted from the above described original image (colored image) S1 into the gray scale image is shown in FIG. 6A. When a horizontal edge filter is applied to the image shown in FIG. 6A, an image shown in FIG. 6B is obtained. Further, when the image shown in FIG. 6B is binarized, i.e., the image is converted to have values of only zero or one, an image shown in FIG. 6C is obtained. And then when a line detection process such as noise reduction or the like, is applied to the image, an image shown in FIG. 7A is obtained. A histogram is formed in Y axis direction, and Y coordinate which has large histogram value is selected. Then horizontal lines which are 20 dots or more are identified and the identified horizontal lines are removed. When this operation is repeated till the horizontal lines are cleared away, an image shown in FIG. 7B is obtained.

Figure 6D:
Figure 6C:
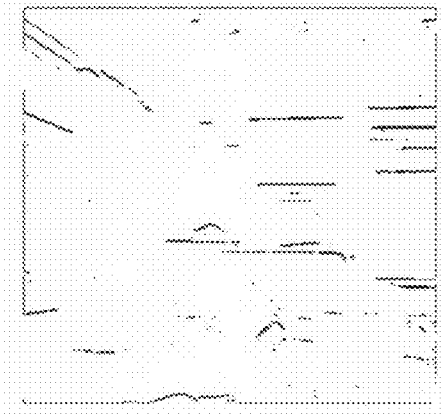
Figure 6E:
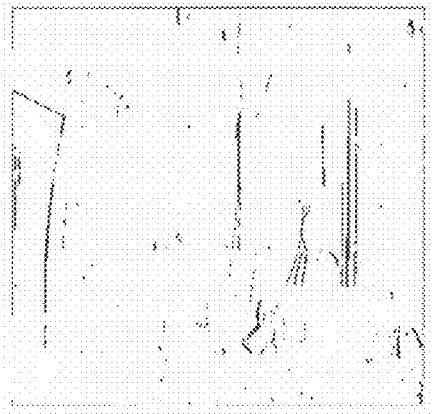

On the other hand, when a vertical edge filter is applied to the image shown in FIG. 6A, an image shown in FIG. 6D is obtained. Further, when the image shown in FIG. 6D is binarized, i.e., the image is converted to have values of only zero or one, an image shown in FIG. 6E is obtained. And then when the line detection process such as the noise reduction or the like, is applied to the image, an image shown in FIG. 7D is obtained. A histogram is formed in X axis direction, and X coordinate which has large histogram value is selected. Then vertical lines which are 20 dots or more are identified and the identified vertical lines are removed. When this operation is repeated till the vertical lines are cleared away, an image shown in FIG. 7E is obtained.

If no horizontal line and no vertical line are detected, a line segment is searched by detecting slant lines from the respective images. For example, in a case where a part of elliptic frame (dotted line) in FIG. 7B is selected from the histogram, a collinear approximation is applied to continued dot. By the digital image process which is performed as above described, a image shown in FIG. 7C is obtained and nineteen line segments are detected in this embodiment. For example, a square figure which is shown by dotted line in FIG. 7C is registered beforehand, if concordance rate of an image is over seventy five percent (75%) for the registered figure, for example, the image is selected and decided as the representative figure U1.

The explanation will be continued with going back to the flow shown in FIG. 4. When extracting and decision of the representative figure U1 (#12) is completed, a determination is made whether the detection of the representative figure U1 succeeded or not (#13). If in a case where it did not succeed, the control operation of the "registration of covered area" is ended with a display <it is impossible to set the covered area> on the display portion 14 (#16). On the other hand if in a case where it succeeded, the covered area T1 is obtained (#14), a shape of the representative figure U1 and the coordinates of the covered area T1 are memorized in the memory portion (for example, a flash memory) 13 (#15), and the control operation of the "registration of covered area" is ended. At this point, the coordinates of the covered area T1 are memorized as a relative position of the covered area T1 with respect to the representative figure U1.

As above described, when the user designates the covered area T1 utilizing the operation portion 12 and the control operation of the "registration of covered area" has been completed, conversation becomes possible. When the conversation is begun, on the display portion 14 and a display portion of a television telephone of a collocutor of the conversation, the original image S1 is displayed in a state that the covered area T1 is hidden (no display, monochrome display, mosaic display, or the like) by the control operation of the "image displaying" (FIG. 5) which will be described later.

During the conversation (in other words during the photographing) if the television telephone is moved abruptly by the user or a third person (movement of the device), the position of the photographed screen T0 is shifted by change of the position of the television telephone. That is to say, the image displayed in the photographed screen T0 is changed from the original image S1 which is shown in FIGS. 1A and 1B to an updated image S2 which is shown in FIGS. 1C and 1D. As it is known by a comparison of FIG. 1A with FIG. 1D, a range W0 of the original image S1 is shifted to left side by change of the position of the television telephone. At this time if the relative position of the covered area T1 is not changed with respect to the photographed screen T0, the part not to display comes off the covered area T1 and the part is displayed. Therefore, the covered area T1 is moved so that the relative position of the covered area T1 is not changed with respect to the original image S1. Because the representative figure U1 represents the position of the original image S1, it is no problem that the covered area T1 is moved in real time so that the relative position of the covered area T1 is not changed with respect to the representative figure U1. By making the covered area T1 move in such a manner, the part not to display would not come off the covered area T1 even when the television telephone is moved.

Moreover, it is preferable that an area of trajectory is selected as a new covered area T1, T2 when the covered area T1 is moved so that the relative position of the covered area T1 is not changed with respect to the representative figure U1. When the image which is displayed in the photographed screen T0 is changed from the original image S1 to the updated image S2, images which do not exist in the original image S1 enter the photographed screen T0. As a result, it may be no problem to expand the covered area so that it covers all images entering newly the photographed screen T0. However, an area of a trajectory when the covered area T1 is moved, is selected as the new covered area T1, T2 (T2 is a newly added covered area) as shown in FIGS. 1C and 1D, then the movement of the television telephone can be clearly shown. At that time it is preferable that the added covered area T2 is displayed in different covering state (no display, monochrome display, mosaic display, or the like) from the covered area T1.

Further, in a case where the position of the representative figure U1 is changed in a state that the covered area T1 before the movement is in contact with an edge of the photographed screen T0 as shown in FIGS. 1A and 1B, there is high possibility that a thing not to display exists outside of the photographed screen adjoining to the covered area T1. As a result, if the position of the representative figure U1 is changed in the state that the covered area T1 before the movement is in contact with the edge of the photographed screen T0, it is preferable that the device is controlled to perform an image displaying to which a process is applied so that the area of the trajectory is set as a new covered area when the covered area T1 is moved in order not to change the relative position of the covered area T1 with respect to the representative figure U1.

Figure 5:
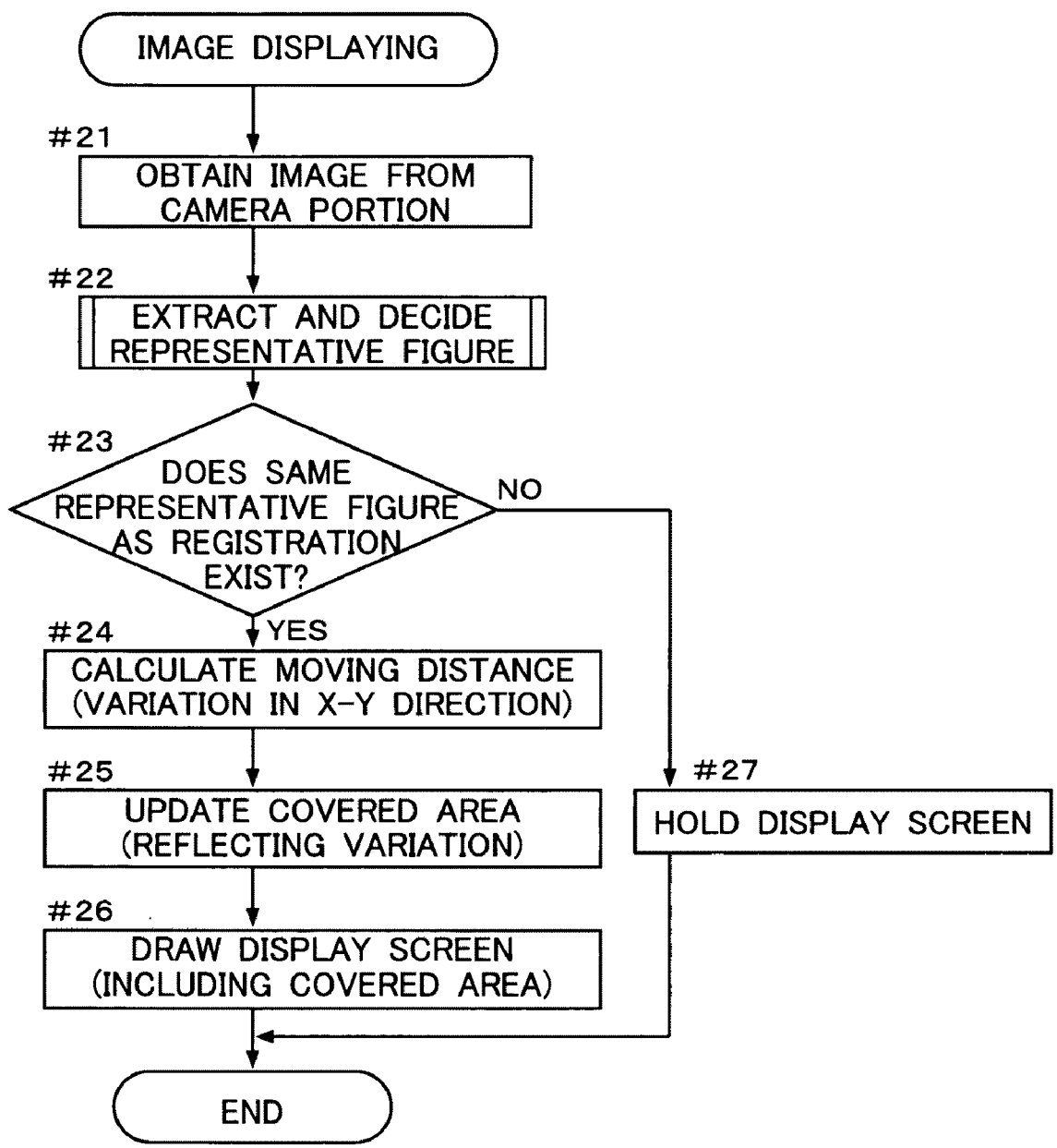
FIG. 5 is a flow chart to show a control operation of image displaying in the embodiment of the television telephone.

When a conversation is begun, the control portion 11 activates a control operation of the "image displaying" which is shown in flow chart in FIG. 5. When the system goes in the flow shown in FIG. 5, the image data is obtained from the camera portion 10 (#21). Then, the representative figure U1 (FIG. 1B) is decided by extracting features of the image from the image data of the whole photographed screen T0 (#22). In the extracting and the deciding the representative figure U1 (#22), the representative figure U1 is decided by applying the digital image process to the original image S1 and selecting a figure which fulfills the prescribed condition as above described. Next, a determination is made whether the representative figure U1 which is same as the representative figure U1 that is registered in the flow shown in FIG. 4, does exist or not (#23). If the same representative figure U1 does not exist, because it is conceivable that abnormal circumstances happen, the system holds the display screen (#27), and finishes the control operation of the "image displaying". If the same representative figure U1 does exist, the system calculates variation in the position of the representative figure U1, i.e., moving distance along the X direction and the Y direction (#24), updates the covered area T1 based on the result of the calculation (#25), draws the display screen (the original image S1 or the updated image S2) (#26), and the control operation of the "image displaying" is ended. When the covered area T1 is updated, because the variation of the representative figure U1 is reflected, if the position of the television telephone is changed, the updated image S2 is displayed in a state that the covered area T1, T2 is hidden (no display, monochrome display, mosaic display, or the like).

In the above described steps #24 to #26, when the position of the representative figure U1 is changed, a process is applied to a performed image displaying so that the covered area T1 is moved in order not to change the relative position of the covered area T1 with respect to the representative figure U1 based on the calculated result of the variation of the position of the representative figure U1. As a result, even if the television telephone is moved, the part not to display does not come off the covered area T1 and the part is not displayed. Further, in a case where the position of the representative figure U1 is changed in a state that the covered area T1 before the movement is in contact with the edge of the photographed screen T0, a process is applied to a performed image displaying so that the area of the trajectory is selected as the new covered area T1, T2 when the covered area T1 is moved in order not to change the relative position of the covered area T1 with respect to the representative figure U1 based on the calculated result of the variation of the position of the representative figure U1. Because of this, even in a case where a thing not to display exists outside of the photographed screen adjoining to the covered area T1, it can be prevented that the thing not to display is displayed, before it happens.

When the system of the television telephone is powered off after the conversation is finished, it may be controlled to restart from an initial state which is before the setting of the covered area. However, it is also preferable to restart the system by calling and using at least one of a shape of the representative figure U1 and the coordinates of the covered area T1 which are memorized in the memory portion 13 (#15). By this arrangement, it becomes possible to omit some operations and to reduce time after the re-start.

As the above described embodiment of the television telephone, the device has a structure in which the control portion decides the representative figure by extracting features of the image from the image data of the whole photographed screen and controls the display portion so that if the position of the representative figure is changed the display portion performs an image displaying to which a process corresponding to the change is applied, therefore it can deal with even the case where the position of the device is abruptly changed. The process corresponding to the change is not limited to the process to move the covered area. For example, the whole photographed screen may be composed of images other than object or it may display a warning sign.

Next, an example of the control operation will be explained in a case where the device having the imaging function is the surveillance camera or the drive recorder. The surveillance camera is a system to perform a photograph for monitoring environment in a store or a bank or the like. For this reason, there is a case that some parts of the photographed screen must be covered from view point of security protection or privacy protection, even when the camera portion is moved. As for the television telephone, if it is controlled so as to monitor a state in a room when all people are away from the room, it can have the function as the surveillance camera. On the other hand, the drive recorder is a system which performs a photograph from a view point of a driver of a vehicle on which the recorder is mounted and records images till a moment when accident happens. As a result, it does not perform an intrinsic function as the drive recorder when an engine is not started up, for example, during parking, therefore, it is possible to give the drive recorder a monitoring function for security to detect position change of the vehicle or the camera portion, for example, operation of a third person. For example, it may have switch control to perform a drive recorder mode when the engine is switched on, and to perform a monitoring mode for detecting movement of the vehicle or the camera portion when the engine is switched off. Further as for the drive recorder, there is a case where some parts of the photographed screen must be covered as well as the surveillance camera. In other words, these systems have a function to cover some parts of the photographed screen from a view point to protect privacy or security and at the same time to detect an accidental movement of the device.

When the system is activated, a photographed screen T0 which is shown in FIG. 1A is displayed on the display portion 14 (FIG. 3). An image which is displayed in this photographed screen T0 is an original image S1. In a case for the surveillance camera, environment of a room or the like is photographed as shown in FIG. 1A. In a case for the drive recorder, environment outside the vehicle is photographed. If there is a part not to display in the photographed screen T0, a user designates an area of the part as the covered area T1 utilizing the operation portion 12. Then the control portion 11 begins a control operation of "registration of the present position and the covered area" which is shown in a flowchart in FIG. 8.

Figure 8:
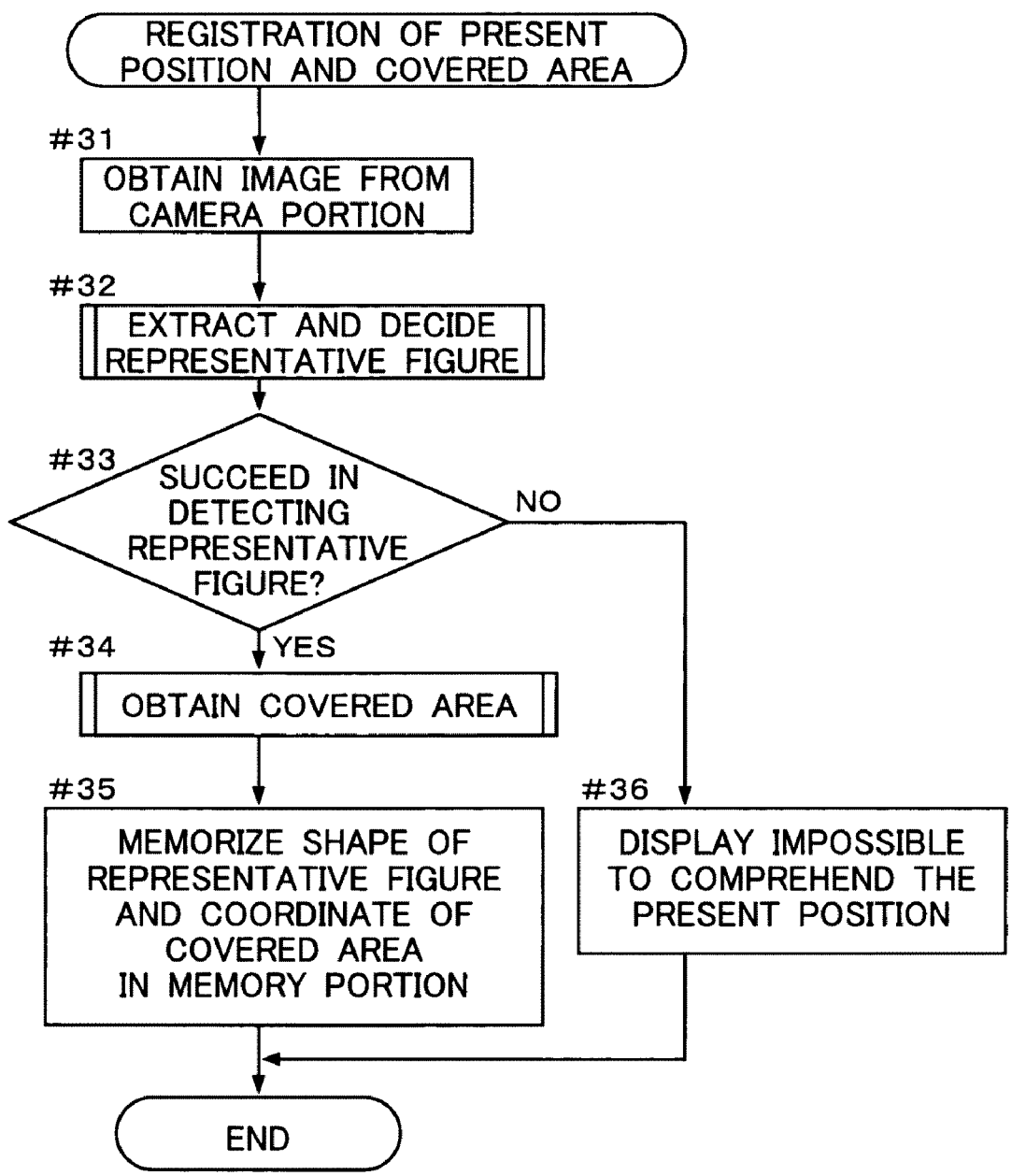
FIG. 8 is a flow chart to show a control operation of registration of a present position and a covered area in the embodiment of the surveillance camera or the drive recorder.

When the system goes in the flow shown in FIG. 8, first the image data is obtained from the camera portion 10 (#31). Then the representative figure U1 (FIG. 1B) is decided by extracting features of the image from the image data of the whole photographed screen T0 (#32). The representative figure U1 is configured to represent the position of the original image S1. As a result, which area of the original image S1 is designated as the covered area T1 can be known from a relative position of the covered area T1 with respect to the representative figure U1.

In a step of extracting and deciding the representative figure U1 (#32), the representative figure U1 is decided by applying a digital image process to the original image S1 and selecting a figure which fulfills a prescribed condition. A figure which has many straight lines is suitable for the representative figure U1 because in many cases the figure is artificial one and a shape of it is hard to deform. For example, in a case for the surveillance camera, a safe, a computer display, or the like is suitable as the representative figure U1, and in a case for the drive recorder, a traffic sign, a traffic display, a lane line on a road, or the like is suitable as the representative figure U1. As for how to obtain the representative figure U1, it is quite the same as for the television telephone (FIGS. 6A to 6E, FIGS. 7A to 7E), a figure corresponding to the system is registered beforehand, and if concordance rate of a figure is over seventy five percent (75%) for the registered figure, for example, the figure is selected and decided as the representative figure U1. At this point, if a plurality of figures are registered, a plurality of the representative figures U1 can be decided. As a result, when a change of the relative position in the plurality of the representative figures U1 is detected (for example, a case where a part of the plurality of representative figures U1 is moved), a determination can be made whether some kind of abnormal circumstances happens.

The explanation will be continued with going back to the flow shown in FIG. 8. When extracting and decision of the representative figure U1 is completed (#32), a determination is made whether the detection of the representative figure U1 succeeded or not (#33). If in a case where it did not succeed, the control operation of "registration of the present position and the covered area" is ended with a display <it is impossible to comprehend the present position> on the display portion 14 (#36). On the other hand if in a case where it succeeded, the covered area T1 is obtained (#34), a shape of the representative figure U1 and the coordinates of the covered area T1 are memorized in the memory portion (for example, a flash memory) 13 (#35), and the control operation of the "registration of the present position and the covered area" is ended. At this point, the coordinates of the covered area T1 are memorized as a relative position of the covered area T1 with respect to the representative figure U1.

As above described, when the user designates the covered area T1 utilizing the operation portion 12 and the control operation of the "registration of the present position and the covered area" has been completed, operation of the system becomes possible. When the operation of the system is begun, on the display portion 14, the original image S1 is displayed in a state that the covered area T1 is hidden (no display, monochrome display, mosaic display, or the like) by the control operation of the "image displaying" (FIG. 10) which will be described later.

During the surveillance photographing if the camera portion 10 or the vehicle is moved abruptly by the user or a third person (movement of the device), the position of the photographed screen T0 is shifted by change of the position of the camera portion 10. That is to say, the image displayed in the photographed screen T0 is changed from the original image S1 which is shown in FIGS. 1A and 1B to an updated image S2 which is shown in FIGS. 1C and 1D. As it is known by a comparison of FIG. 1A with FIG. 1D, a range W0 of the original image S1 is shifted to left side by change of the position of the camera portion 10. At this time if the relative position of the covered area T1 is not changed with respect to the photographed screen T0, the part not to display comes off the covered area T1 and the part is displayed. Therefore, the covered area T1 is moved so that the relative position of the covered area T1 is not changed with respect to the original image S1. Because the representative figure U1 represents the position of the original image S1, it is no problem that the covered area T1 is moved in real time so that the relative position of the covered area T1 is not changed with respect to the representative figure U1. Because the covered area T1 is moved in such a manner, the part not to display would not come off the covered area T1 even when the camera portion 10 or the vehicle is moved.

Moreover, it is preferable that an area of trajectory is selected as a new covered area T1, T2 when the covered area T1 is moved so that the relative position of the covered area T1 is not changed with respect to the representative figure U1. When the image which is displayed in the photographed screen T0 is changed from the original image S1 to the updated image S2, images which do not exist in the original image S1 enter the photographed screen T0. As a result, it may be no problem that the covered area is expanded to cover all images entering newly the photographed screen T0. However, if an area of a trajectory when the covered area T1 is moved, is selected as the new covered area T1, T2 (T2 is an added covered area) as shown in FIGS. 1C and 1D, the movement of the camera portion 10 or the vehicle can be clearly shown. At that time it is preferable that the added covered area T2 is displayed in different covering state (no display, monochrome display, mosaic display, or the like) from the covered area T1.

Further, in a case where the position of the representative figure U1 is changed in a state that the covered area T1 before the movement is in contact with an edge of the photographed screen T0 as shown in FIGS. 1A and 1B, there is high possibility that a thing not to display exists outside of the photographed screen adjoining to the covered area T1. As a result, if the position of the representative figure U1 is changed in the state that the covered area T1 before the movement is in contact with the edge of the photographed screen T0, it is preferable that the device is controlled to perform an image displaying to which a process is applied so that the area of the trajectory is set as a new covered area when the covered area T1 is moved in order not to change the relative position of the covered area T1 with respect to the representative figure U1.

Figure 9:
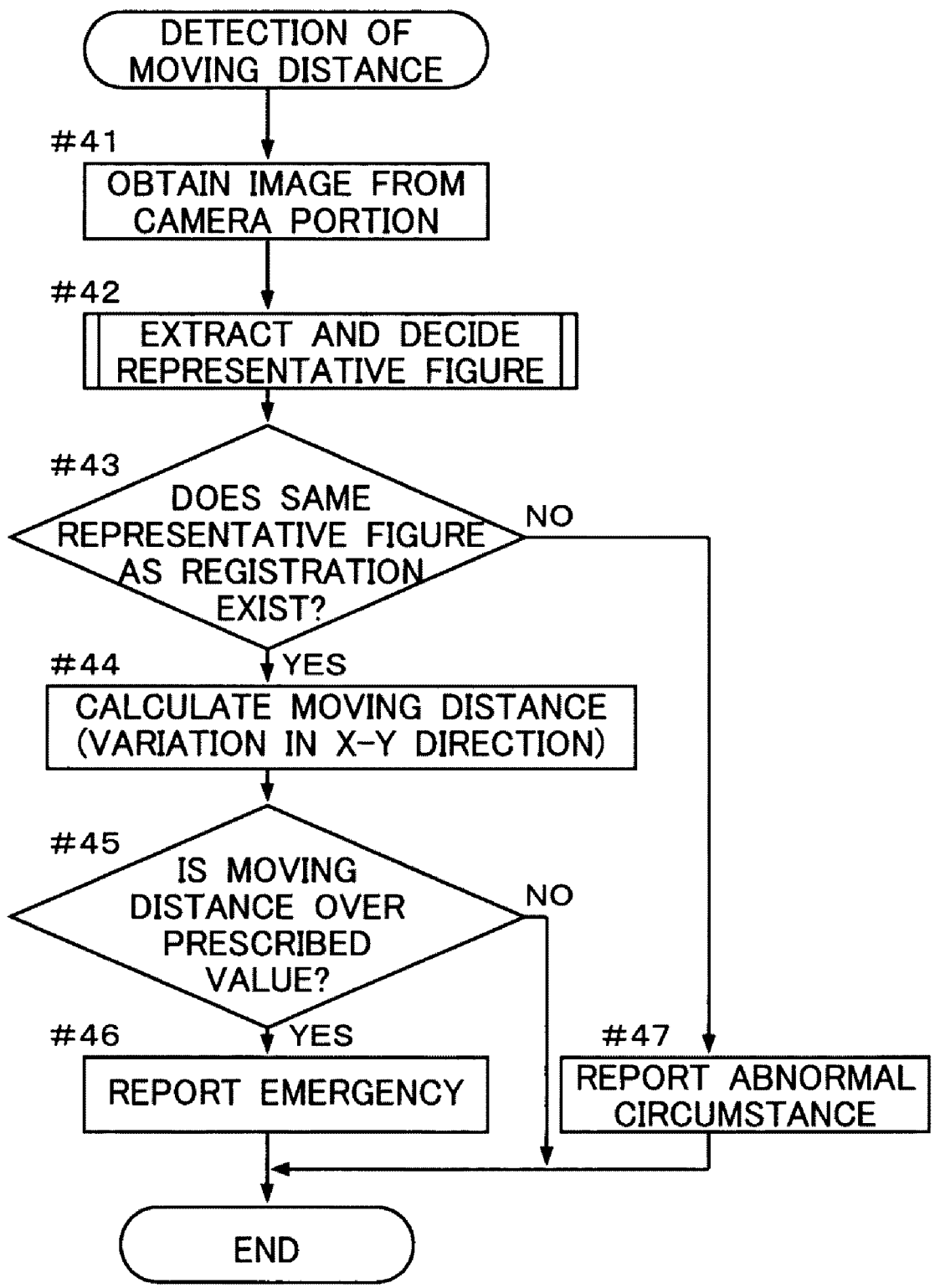
FIG. 9 is a flow chart to show a control operation of detection of a moving distance in the embodiment of the surveillance camera or the drive recorder.

When the surveillance photographing is begun, the control portion 11 activates a control operation of "detection of moving distance" which is shown in flow chart in FIG. 9. When the system goes in the flow shown in FIG. 9, first the image data is obtained from the camera portion 10 (#41). Then, the representative figure U1 (FIG. 1B) is decided by extracting features of the image from the image data of the whole photographed screen T0 (#42). In the extracting and the deciding the representative figure U1 (#42), the representative figure U1 is decided by applying the digital image process to the original image S1 and selecting a figure which fulfills the prescribed condition as above described. Next, a determination is made whether the representative figure U1 which is same as the representative figure U1 that is registered in the flow shown in FIG. 8, does exist or not (#43). If the same representative figure U1 does not exist, because it is conceivable that abnormal circumstances happen, an alarm for abnormal circumstances is performed by the reporting portion 15 (FIG. 3) (#47), and finishes the control operation of the "detection of moving distance". If the same representative figure U1 does exist, the system calculates variation in the position of the representative figure U1, i.e., moving distance along the X direction and the Y direction (#44), and a determination is made whether the moving distance is over a prescribed value (#45). If the moving distance is not over the prescribed value, the control operation of the "detection of moving distance" is ended. If the moving distance is over the prescribed value, after the alarm for abnormal circumstances is performed (#46), the control operation of the "detection of moving distance" is ended. At this point there is no need to perform the control operation of the "detection of moving distance" in real time, for example, it is no problem that it is performed in every one or two minutes.

Figure 10:
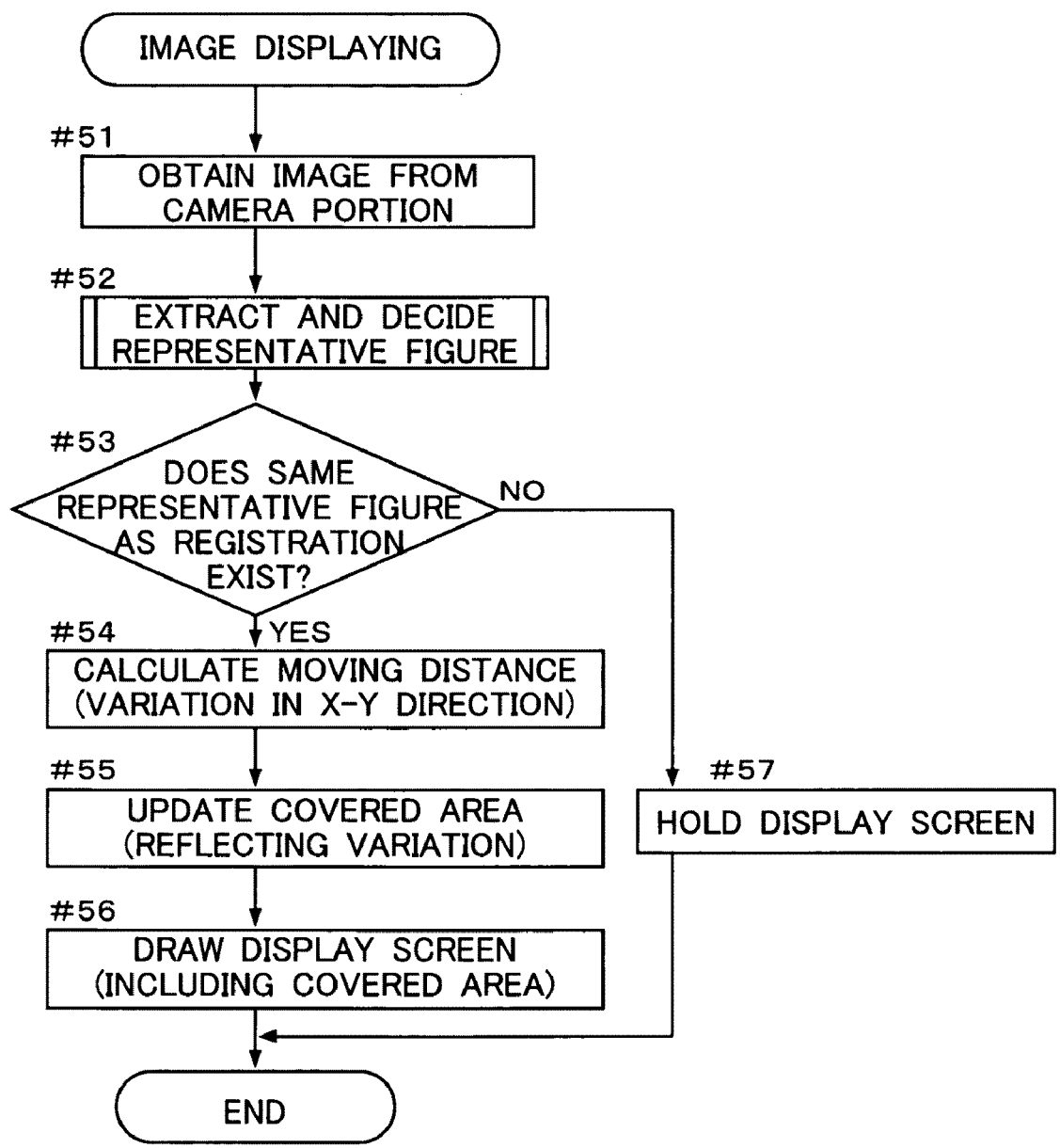
FIG. 10 is a flow chart to show a control operation of image displaying in the embodiment of the surveillance camera or the drive recorder.

Further when the surveillance photographing is begun, the control portion 11 activates a control operation of the "image displaying" which is shown in flow chart in FIG. 10. When the system goes in the flow shown in FIG. 10, first the image data is obtained from the camera portion 10 (#51). Then, the representative figure U1 (FIG. 1B) is decided by extracting features of the image from the image data of the whole photographed screen T0 (#52). In the extracting and the deciding the representative figure U1 (#52), the representative figure U1 is decided by applying the digital image process to the original image S1 and selecting a figure which fulfills the prescribed condition as above described. Next, a determination is made whether the representative figure U1 which is same as the representative figure U1 that is registered in the flow shown in FIG. 8, does exist or not (#53). If the same representative figure U1 does not exist, because it is conceivable that abnormal circumstances happen, the system holds the display screen (#57), and finishes the control operation of the "image displaying". If the same representative figure U1 does exist, the system calculates the variation in the position of the representative figure U1, i.e., the moving distance along the X direction and the Y direction (#54), updates the covered area T1 based on the result of the calculation (#55), draws the display screen (the original image S1 or the updated image S2) (#56), and the control operation of the "image displaying" is ended. When the covered area T1 is updated, because the variation of the representative figure U1 is reflected, if the position of the camera portion 10 or the vehicle is changed, the updated image S2 is displayed in a state that the covered area T1, T2 is hidden (no display, monochrome display, mosaic display, or the like).

In the above described steps #54 to #56, when the position of the representative figure U1 is changed, a process is applied to an performed image displaying so that the covered area T1 is moved in order not to change the relative position of the covered area T1 with respect to the representative figure U1 based on the calculated result of the variation of the position of the representative figure U1. As a result, even if the camera portion 10 or the vehicle is moved, the part not to display does not come off the covered area T1 and it is not displayed. Further, in a case where the position of the representative figure U1 is changed in a state that the covered area T1 before the movement is in contact with the edge of the photographed screen T0, a process is applied to an performed image displaying so that the area of the trajectory is selected as the new covered area T1, T2 when the covered area T1 is moved in order not to change the relative position of the covered area T1 with respect to the representative figure U1 based on the calculated result of the variation of the position of the representative figure U1. Because of this, even in a case where a thing not to display exists outside of the photographed screen adjoining to the covered area T1, it can be prevented the thing not to display is displayed, before it happens.

When the system of the surveillance camera or the drive recorder is powered off after the surveillance photographing is finished, it may be controlled to restart the system from an initial state which is before setting of the covered area. However, it is also preferable to restart the system by calling and using at least one of a shape of the representative figure U1 and the coordinates of the covered area T1 which are memorized in the memory portion 13 (#35). By this arrangement, it becomes possible to omit some operations and to reduce time after the re-start.

As the above described embodiment of the surveillance camera or the drive recorder, if the control portion decides the representative figure by extracting features of the image from the image data of the whole photographed screen and controls the reporting portion so as to report the change of the device position if the position of the representative figure is changed over the prescribed value, abrupt change of the device position can be known in the case where the position of the device is abruptly changed. Further, if a plurality of figures are set and registered, a plurality of the representative figures can be decided. As a result, when a change of the relative position in the plurality of the representative figures is detected, for example, a case where a part of the plurality of representative figures is moved, it is possible to know that some kind of abnormal circumstances happen. For example, when the figures such as a key, a safe, a wallet, and the like are registered as the registered figure, and if at least any one of them is moved, it is possible to know what is moved by a third person.

As it can be understood by the above described explanation, the device has a structure in which the control portion decides the representative figure by extracting features of the image from the image data of the whole photographed screen and controls the display portion so that if the position of the representative figure is changed the display portion performs an image displaying to which a process corresponding to the change is applied, therefore it can deal with even the case where the position of the device is abruptly changed. Further, the reporting portion is controlled so as to report the change of the device position if the position of the representative figure is changed over the prescribed value, so abrupt change of the device position can be known.

What is claimed is:

1. A device having an imaging function, comprising:
    a camera portion to capture optically an image of an object and to output the image as an image data;
    a display portion to perform an image displaying using the image data from the camera portion;
    an operation portion to designate a prescribed part in a photographed screen as a covered area to cover the part;
    a control portion to control the display portion so that the display portion does not perform an image displaying using the image data in the covered area which is designated by the operation portion and to decide a representative figure by extracting features of the image from the image data of the whole photographed screen; and
    a memory portion to memorize at least one of the covered area and the representative figure, wherein
    if the position of the representative figure is changed while the covered area before the movement is in contact with an edge of the photographed screen, the control portion controls the display portion so that the display portion performs an image displaying to which a process is applied to select an area of a trajectory as a new covered area when the covered area is moved in order not to change the relative position of the covered area with respect to the representative figure based on the calculated result of the variation of the position of the representative figure.

2. The device according to claim 1, further comprising a reporting portion to perform a reporting to outside of the device, wherein the control portion controls the reporting portion so that the reporting portion reports the change of the device position if the variation is over a prescribed value.

3. A device having an imaging function, comprising:
    a camera portion to capture optically an image of an object and to output the image as an image data;
    a display portion to perform an image displaying using the image data from the camera portion;
    an operation portion to designate a prescribed part in a photographed screen as a covered area to cover the part;
    a control portion to control the display portion so that the display portion does not perform an image displaying using the image data in the covered area which is designated by the operation portion and to decide a representative figure by extracting features of the image from the image data of the whole photographed screen; and
    a memory portion to memorize at least one of the covered area and the representative figure, wherein
    if a position of the representative figure is changed, the control portion controls the display portion so that the display portion performs an image displaying to which a process is applied to move the covered area in order not to change a relative position of the covered area with respect to the representative figure based on a calculated result of the variation of the position of the representative figure, or
    if the position of the representative figure is changed while the covered area before the movement is in contact with an edge of the photographed screen, the control portion controls the display portion so that the display portion performs an image displaying to which a process is applied to select an area of a trajectory as a new covered area when the covered area is moved in order not to change the relative position of the covered area with respect to the representative figure based on the calculated result of the variation of the position of the representative figure.

4. The device according to claim 3, further comprising a reporting portion to perform a reporting to outside of the device, wherein the control portion controls the reporting portion so that the reporting portion reports the change of the device position if the variation is over a prescribed value.

* * * * *